United States Patent
Mullen et al.

(10) Patent No.: US 8,131,671 B2
(45) Date of Patent: Mar. 6, 2012

(54) UNINTERRUPTED DATA ACCESS DURING THE MIGRATION OF DATA BETWEEN PHYSICAL FILE SYSTEMS

(75) Inventors: Shawn Patrick Mullen, Buda, TX (US); Jessica Carol Murillo, Round Rock, TX (US); Gerald Francis McBrearty, Austin, TX (US); Johnny Meng-Han Shieh, Austin, TX (US); Susann Marie Keohane, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/136,136

(22) Filed: Jun. 10, 2008

(65) Prior Publication Data

US 2009/0307245 A1    Dec. 10, 2009

(51) Int. Cl.
G06F 7/00 (2006.01)
G06F 17/00 (2006.01)
(52) U.S. Cl. ........................... 707/610; 707/636
(58) Field of Classification Search .................. None
See application file for complete search history.

(56) References Cited

U.S. PATENT DOCUMENTS

| | | | |
|---|---|---|---|
| 7,672,981 B1 * | 3/2010 | Faibish et al. | 707/999.204 |
| 2001/0051955 A1 | 12/2001 | Wong | |
| 2005/0207732 A1 * | 9/2005 | Cho et al. | 386/52 |
| 2007/0088702 A1 * | 4/2007 | Fridella et al. | 707/10 |
| 2009/0182970 A1 * | 7/2009 | Battista et al. | 711/173 |

OTHER PUBLICATIONS

ByteandSwitch: The Storage Networking Site, NAS Clustering and Virtualization, NetworkingComputing.com, Online Article, Mar. 20, 2006.
Acopia Networks, Intelligent File Virtualization with Acopia, White Paper, Feb. 2006.
NeoPath Networks, Inc., NeoPath's Smart Virtualization Archeticture, White Paper, Feb. 2007.
EMC Corporation, EMC Rainfinity Global File Virtualization, White Paper, Data Sheet H2008.1, 2006.
Network Appliance Inc., NetApp Software Virtual File Manager, White Paper 2006.

* cited by examiner

*Primary Examiner* — Rehana Perveen
*Assistant Examiner* — Raheem Hoffler
(74) *Attorney, Agent, or Firm* — Yee & Associates, P.C.; David A. Mims, Jr.; Rudolf O. Siegesmund

(57) ABSTRACT

A Migration Thin Virtual File System ("MTVLS") conducts file migration using a thin virtual layer that is size selectable and provides an uninterruptible migration path from the old file system to the new file system without an increase in the time to receive data. The MTVLS selects a file from the source file system, opens a corresponding file in the target system, mounts the thin virtual layer over the source file and the target file, and migrates that data from the source file to the target file.

17 Claims, 5 Drawing Sheets

UNINTERRUPTED DATA ACCESS DURING THE MIGRATION OF DATA BETWEEN PHYSICAL FILE SYSTEMS

FIELD OF THE INVENTION

The present invention relates generally to the transfer of data between file systems using a virtual file system and specifically to using a size selectable thin virtual layer to transfer data from an old file system to a new file system.

BACKGROUND OF THE INVENTION

File migration is a process used to move files from an older file system to a newer file system in order to take advantage of the new features offered by the new file system. Typically, current file migration systems deny access to a file in the old file system during file migration to ensure that no modifications to the data in the old file system are lost when the old file system is removed.

A known method to allow file access during migration is use of a virtual file system ("VFS"). A VFS is an "abstraction layer" placed on top of a file system to create a single logical storage where the user can change, add, consolidate, or migrate storage. The VFS is placed on top of the old file system and the new file system to allow a user to access a file in the old file system through the VFS while the file is being migrated. The VFS applies the user's modifications to the copy of the file on the new system. Thus, the VFS allows a user to access and make changes to a file's contents without knowing that the file is being migrated and without a concern as to the data's transfer to the new file system.

Although a VFS solves the problem of modifying a file during migration, the VFS must determine the physical location of a file in order to migrate the file and to access the data during migration. Current VFS systems cause an increase in the lapse of time between the initiation of a request for the data and the receipt of the data. As such, the full benefits of the new file system are not realized until migration is completed.

Thus, a need exists for a virtual file transfer application that allows file changes to be made simultaneously to the file system during migration without interrupted access or an increase in the time to receive data.

SUMMARY OF THE INVENTION

A Migration Thin Virtual Layer System ("MTVLS") allows file changes to be made to the file system during migration without interrupted access or an increase in the time to receive data. The MTVLS conducts migration using a thin virtual layer that is size selectable and provides an uninterruptible migration path from the old file system to the new file system. The MTVLS selects a file from the source file system, opens a corresponding file in the target system, mounts the thin virtual layer over the source file and the target file, and migrates that data from the source file to the target file. In this case the MTVLS will write the data to both the source file and the target file. In addition, while the data is being migrated, the thin virtual layer can either write data to both the source file and the target file or to the target file only. While the data is being migrated, the thin virtual layer can retrieve data from either the source file or the target file.

The thin virtual layer tracks the locations of all the data in the source file and the target file until the source file is completely migrated to the target file. When migration is completed, the thin virtual layer is removed, a thin virtual layer is applied to another source file and another target file until the new source file is migrated to the new target file, and the process is repeated until the entire source file system is migrated to the target file system. Using this granular migration technique, the MTVLS selects files for migration in two ways. The first way is proactive, in which the MTVLS fetches data from the source file system and migrates the data to the target file system. For example, the MTVLS can be configured to migrate files in accordance with a user policy such as ranking source files by frequency of use. The second way is opportunistic. When a user accesses a source file to read or write data, the MTVLS automatically selects that file for transfer using the thin virtual file layer. Since the file that has been accessed is more likely to be accessed again, opportunistic migration ensures that the user's next access will be to the target file in the new system.

The MTVLS can be applied to individual files, directories or to an entire file system. However, because the size of the thin virtual file layer can be configured by the user, the amount of data locations the thin virtual file layer must track in both the source file and the target file can be reduced by configuring MTVLS to migrate data using the smallest thin virtual layers thereby reducing memory latency. The MTVLS, through the thin virtual file layer, allows for uninterruptible and simultaneous migration or transfer of data from the source file system to the target file system. Furthermore, the MTVLS allows files frequently accessed by the user to be migrated sooner, thereby taking advantage of the new file system.

BRIEF DESCRIPTION OF DRAWINGS

The novel features believed characteristic of the invention are set forth in the appended claims. The invention itself, as well as a preferred mode of use, further objectives, and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the MTVLS are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as "MTVLS."

Figure 1:
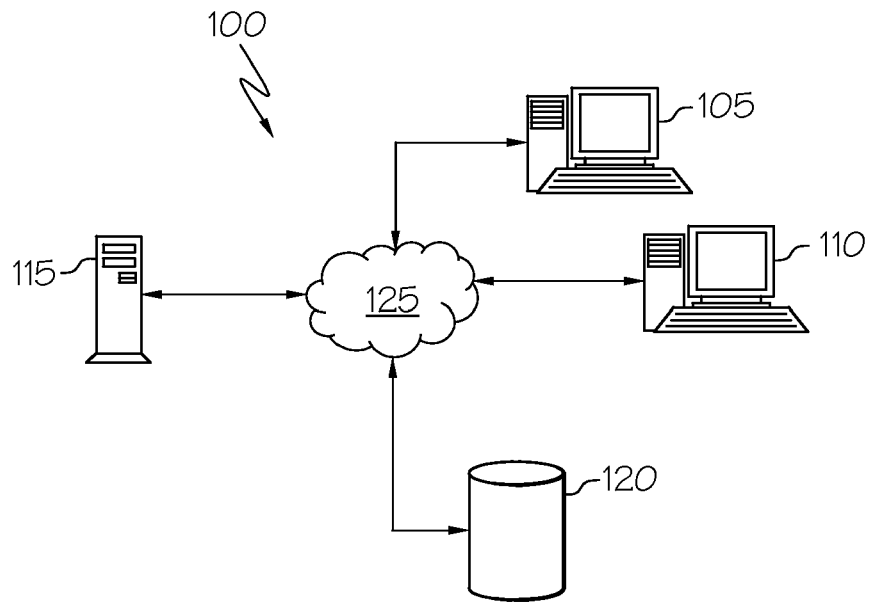
FIG. 1 depicts an exemplary network in which the MTVLS may be employed.

Additionally, MTVLS is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
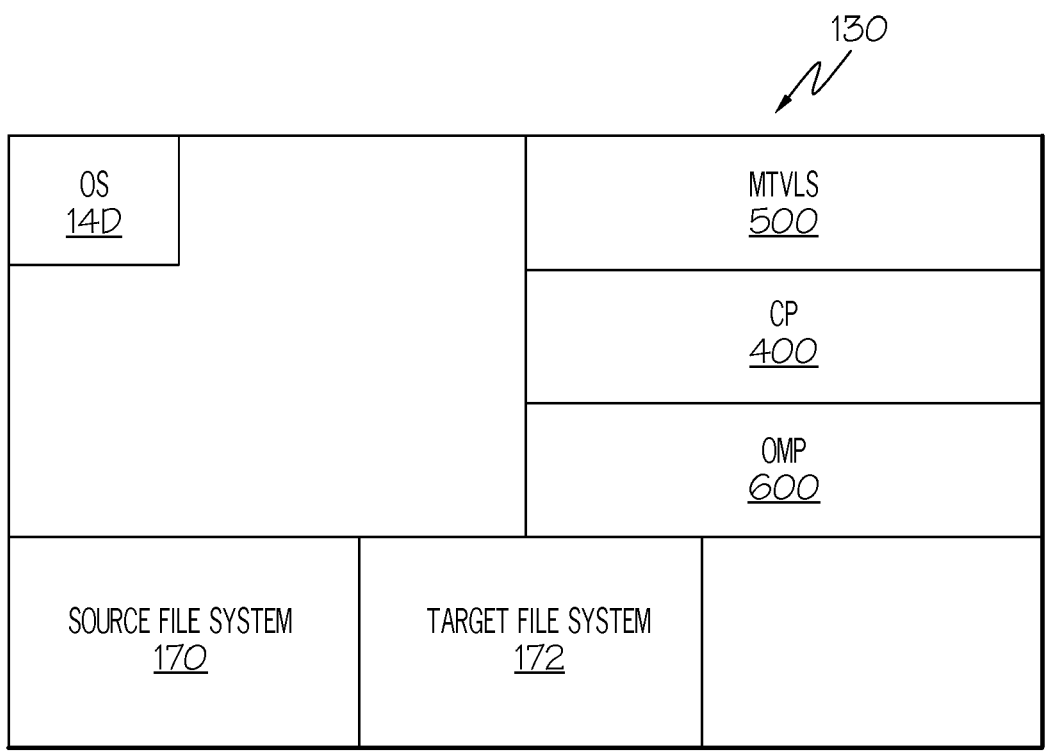
FIG. 2 depicts an exemplary memory in which the MTVLS is encoded.

MTVLS, typically stored in a memory such as memory 130 of FIG. 2, is represented schematically as MTVLS 500. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, MTVLS 500 may reside in more than one memory distributed across different computers, servers, logical partitions, or other hardware devices. The elements depicted in memory 130 may be located in or distributed across separate memories in any combination, and MTVLS 500 may be adapted to identify, locate, and access any of the elements and coordinate actions, if any, by the distributed elements. Thus, FIG. 2 is included merely as a descriptive expedient and does not necessarily reflect any particular physical embodiment of memory 130. As depicted in FIG. 2, though, memory 130 may include additional data and programs with which MTVLS 500 interacts such as Configuration Program (CP) 400 and Opportunistic Migration Program (OMP) 600, source file system 170 and target file system 172.

As used herein, "granular virtualization" means the process of migrating a particular part of the group of files or directories to be migrated using a size selectable thin virtual file layer. As used herein, "proactive migration" means migrating data using a thin virtual layer in accordance with a user configurable policy. As used herein, "opportunistic migration" means automatically selecting a file for transfer using the thin virtual file layer when a user accesses a source file to read or write data.

Figure 3A:
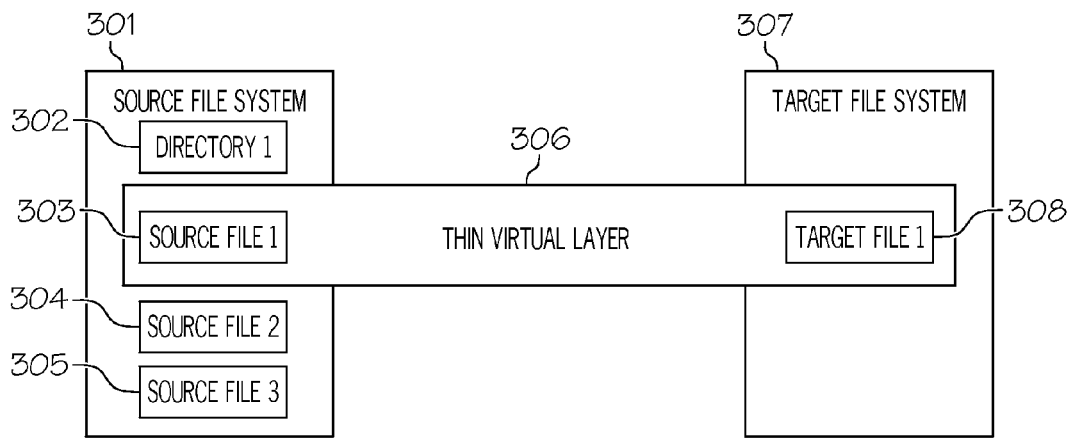
FIG. 3A depicts application of the thin virtual layer.
Figure 3B:
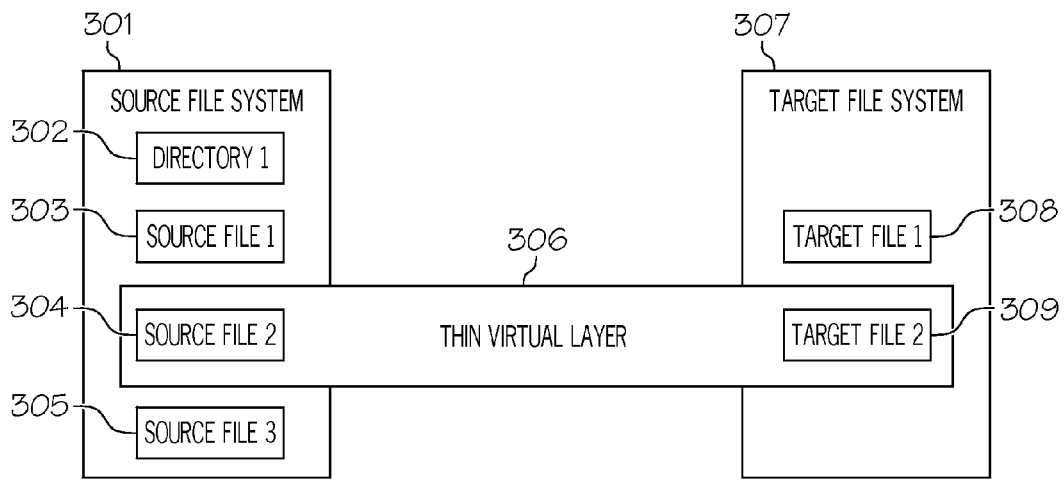
FIG. 3B depicts another application of the thin virtual layer.

FIGS. 3A and 3B illustrate the operation of MTVLS 500. Initially, source file 303 of source file system 301 is selected to be migrated or copied to target file system 307. Any portion of source file system 301 may be selected, including but not limited to a single file, groups of files, a directory, and groups of directories. A corresponding target file 308 is opened in target file system 307. Thin virtual layer 306 is mounted over source file 303 and target file 308. Mounting is a process whereby the thin virtual layer is prepared for use by the operating system. The data within source file "1" 303 is then migrated from source file system 301 to target file "1" 308 in target file system 307. Source file system 301 and target file system 307 may be on the same physical memory device or may be on separate physical memory devices. A copy of source file "1" 303 from source file system 301 is removed, after source file "1" 303 is successfully copied to target file 308 in target file system 307, in order to free up memory on the physical memory device. FIG. 3B shows selection of source file "2" 304 and creation of target file "2" 309. Thin virtual file layer 306 is moved to "source file 2" 304 and "target file 2" 309, and the data within source file "2" is migrated to target file "2" 309. The process is repeated until all files within source file 301 are migrated to target file system 307.

Figure 4:
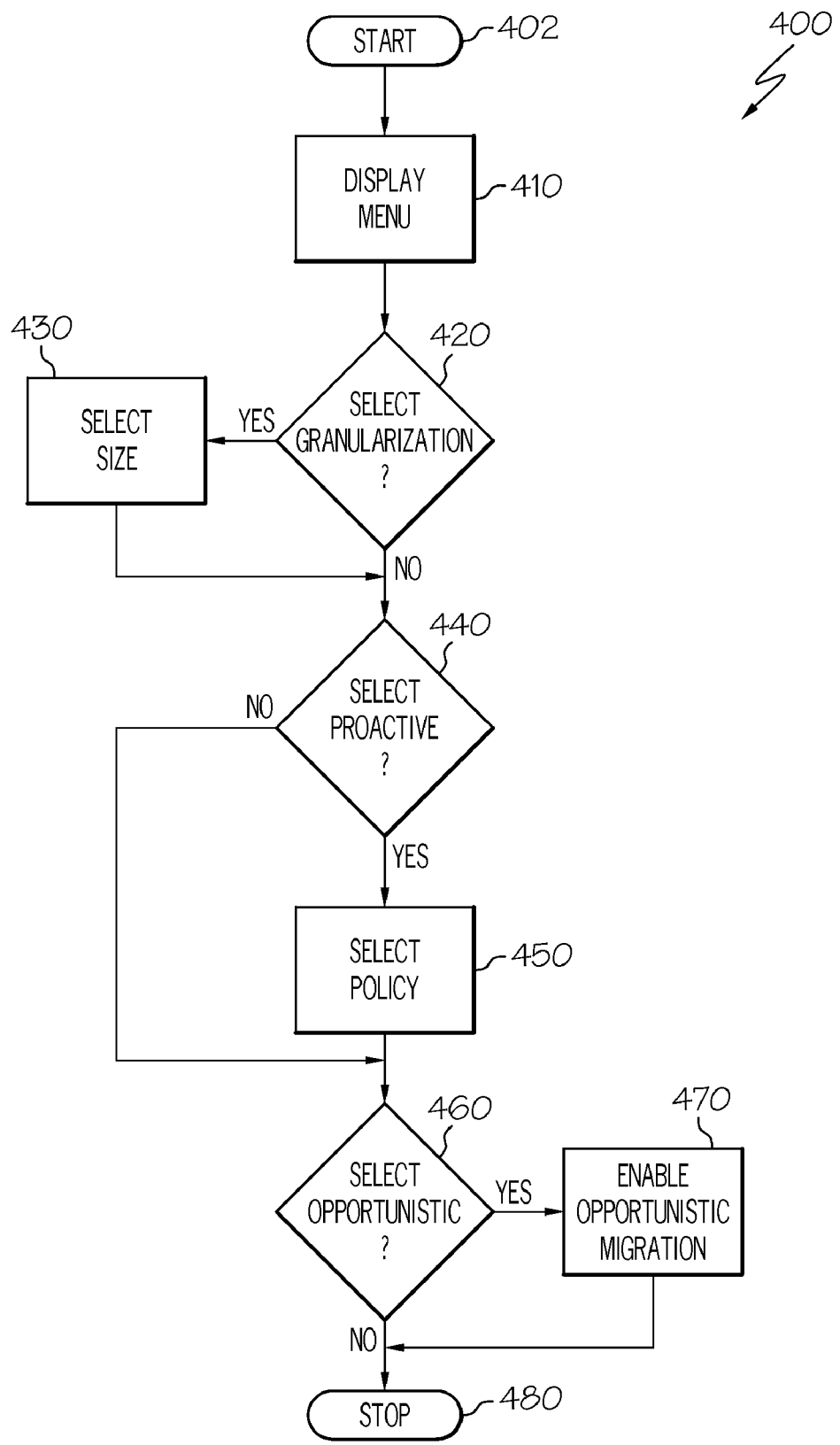
FIG. 4 depicts a flow chart of the configuration program of the MTVLS.

FIG. 4 depicts a flow chart of CP 400. CP 400 starts (402) and a menu is displayed to the user. The user determines whether to select granularization (420). If the user selects granularization, the user chooses the size of a group of files or directories to be migrated (430). The number of files in the source file of the file system may be advantageously chosen so that the fewest number of files will be accessed via the thin virtual layer, thereby reducing the effect of memory latency by the thin virtual file layer. The MTVLS may mount the thin virtual file layer over a single file so that none of the other files in either the source file system or the target file system are affected by the latency incurred while accessing files via the thin virtual layer. If the user does not select granularization, a default size will be used.

The user determines whether to select proactive migration (440). If the user selects proactive migration, the user selects a policy to apply (450). For example, a user policy may be to rank source files by frequency of use and to migrate in order of frequency of use.

Next, the user determines whether to select opportunistic migration (460). If the user selects opportunistic migration, OMP 600 will be enabled (470). At some point during migration of the source file system 301, a user may access part of source file system 301, and if opportunistic migration is enabled, OMP 600 (see FIG. 6) will interact with MTVLS 500.

Figure 5:
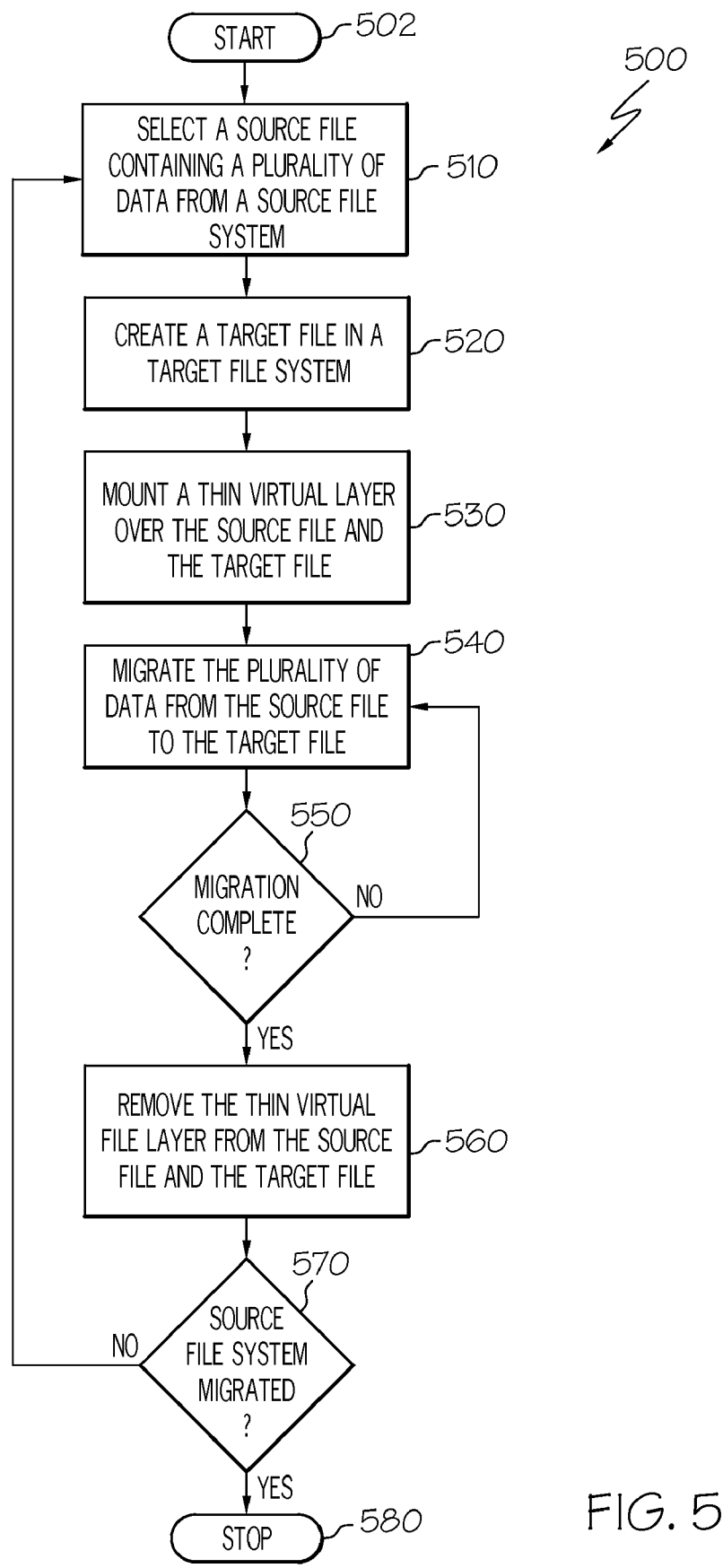
FIG. 5 depicts a flow chart of the migration program of the MTVLS.

FIG. 5 depicts a flow chart of the MTFVS program. MTFVS starts (502) and selects a source file containing a plurality of data from a source file system (510). MTFVS creates a target file in the target file system (520). MTFVS mounts a thin virtual layer over the source file and the target file (530). MTFVS migrates the plurality of data from the source file to the target file (540). A determination is made whether migration is complete (550). If migration is complete, MTFVS removes the thin virtual layer from the source file and the target file (560). A determination is made whether the source file system has been migrated (570). If not, MTFVS goes to step 510 and repeats the process with the next source file. If the source file system has been migrated, MTFVS stops (580).

Figure 6:
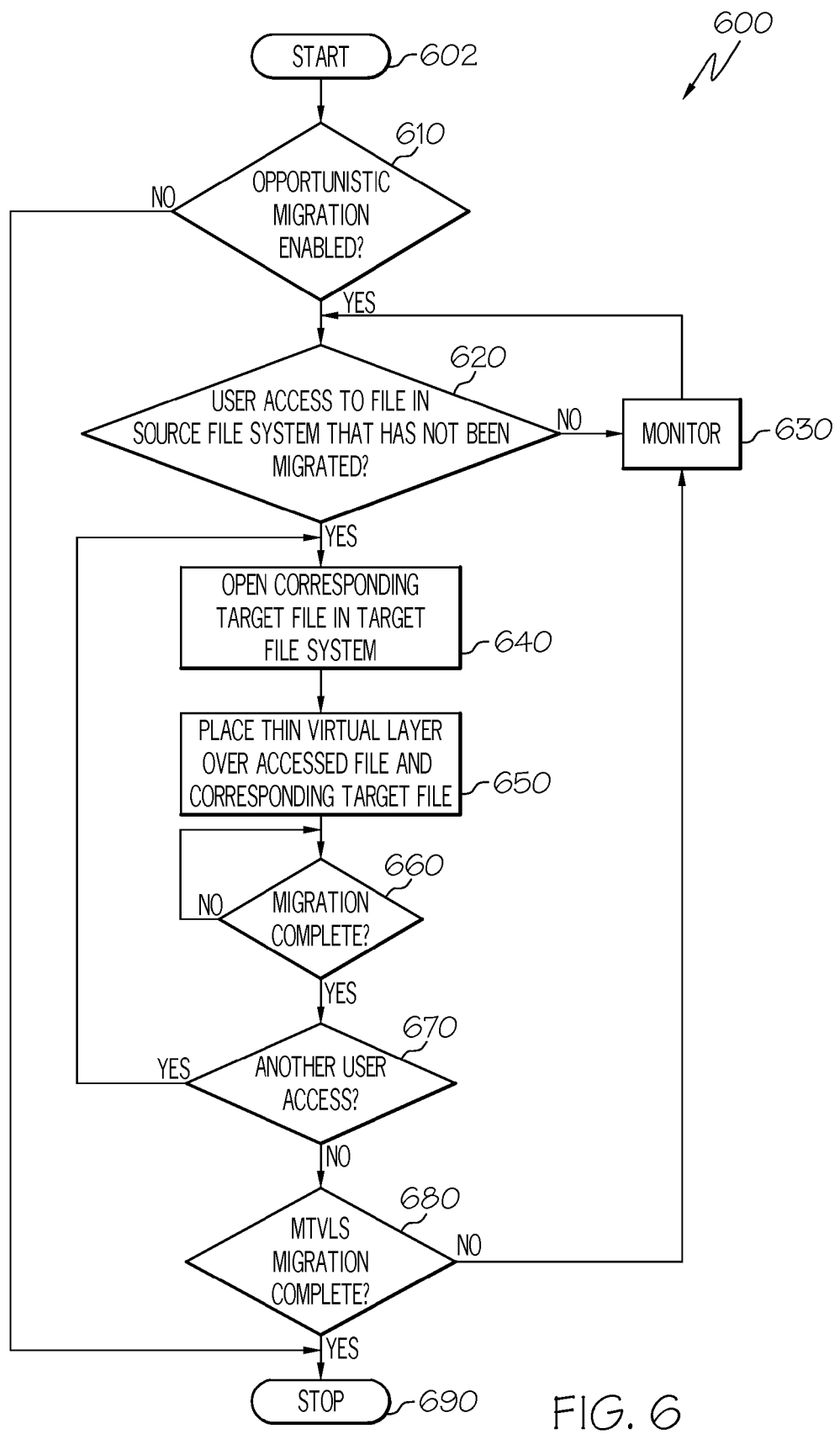
FIG. 6 depicts a flow chart of the opportunistic migration program of the MTVLS.

FIG. 6 depicts a flow chart of the logic of OMP 600. OMP 600 starts (602) and determines whether or not opportunistic migration has been enabled by a user in configuration program 400. If opportunistic migration has been enabled, opportunistic migration program 600 determines whether MTVLS 150 is operating, and whether a user has accessed a source file that has not been migrated. If a user has not accessed a file, OMP 600 will monitor MTVLS 150 (630). If a user has accessed a file, OMP 600 will open a corresponding file in the target file system (640). OMP 600 will place a thin virtual layer over the accessed file and the corresponding target file (650). OMP 600 determines whether migration of the accessed file is complete. If migration of the accessed file is complete, OMP 600 determines whether there is another user access of an unmigrated source file (670). If there is another user access, OMP 600 goes to step 640. If not, OMP 600 determines whether migration of the source file system is complete (680). If not, OMP 600 goes to step 610, and if so, OMP 600 stops.

For example, if a user decides to migrate one hundred (100) files, the migration process may migrate the first file, or file number one (1), through the last file, file number one hundred (100), consecutively, in this order. If the last file, file one hundred (100), is accessed by a user before it is scheduled to be migrated—e.g., during migration of the first file, file number one (1)—opportunistic migration may occur so that the last file is migrated before the second file. This allows the user of the last file to benefit from the target file system at an earlier point in time than if the file was migrated last.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way expect by proper construction of the following claims.

The invention claimed is:

1. A computer-implemented method for migrating files from a source file system to a target file system comprising:
    selecting a level of granularization for a virtual file layer, wherein selecting the level of granularization includes selecting a size for the virtual file layer;
    selecting a source file containing a plurality of data from the source file system in a accordance with a user configurable policy;
    responsive to selecting the source file, creating a target file in the target file system;
    responsive to selecting the source file and creating the target file, mounting the virtual file layer over the source file and the target file;
    migrating the plurality of data from the source file to the target file; and
    responsive to a completion of migration of the plurality of data from the source file to the target file, removing the virtual file layer from the source file and the target file;
    wherein the virtual file layer provides an uninterruptible migration path from the source file to the target file and reads data from and writes data to the source file and the target file during the migrating, wherein the target file system is one of: JFS, JFS2, or GPFS.

2. The computer-implemented method of claim 1 further comprising the step of:
    repeating the mounting, migrating, and removing until the entire source file system is migrated.

3. The computer-implemented method of claim 1, further comprising:
    accessing a second source file of the source file system;
    opening a second target file corresponding to the second source file;
    mounting a second virtual the layer over the second source file and the second target file;
    migrating the second source file to the target file; and
    removing the virtual file layer from the second source file and the target file.

4. The computer-implemented method of claim 3, wherein the accessing comprises a write access.

5. The computer-implemented method of claim 4, further comprising:
    performing the write access to the source file system and to the target file system.

6. The computer-implemented method of claim 1, wherein the source file comprises one of: a file or a group of files.

7. The computer-implemented method of claim 1, wherein the source file comprises one of: a directory or a group of directories.

8. A computer-implemented method for opportunistic migration of a plurality of files from a source file system to a target file system a comprising:
    selecting a level of granularization for a virtual file layer, wherein selecting the level of granularization includes selecting a size for the virtual file layer;
    responsive to a user opening a source file containing a plurality of data, accessing the source file from the source file system;
    responsive to accessing the source file, creating a target file in the target file system;
    responsive to accessing the source file and creating the target file, mounting the virtual file layer over the source file and the target file;
    migrating the plurality of data from the source file to the target file; and
    responsive to a completion of migration of the plurality of data from the source file to the target file, removing the virtual file layer from the source file and the target file;
    wherein the virtual file layer provides an uninterruptible migration path from the source file to the target file and reads data from and writes data to the source file and the target file during the migrating, wherein the target file system is one of: JFS, JFS2, or GPFS.

9. The computer-implemented method of claim 8, wherein the accessing comprises a write access.

10. The computer-implemented method of claim 9, further comprising:
    performing the write access to the source file system and to the target file system.

11. The computer-implemented method of claim 1, wherein the source file comprises one of: a file or a group of files.

12. The computer-implemented method of claim 1, wherein the source file comprises one of: a directory or a group of directories.

13. A computer program product for causing a computer to perform file migration, comprising:
    a computer readable storage medium;
    a program stored in the computer readable storage medium;
    wherein the computer readable storage medium, so configured by the program, causes the computer to:
    responsive to a user selecting a level of granularization for a virtual file layer, access a source file containing a plurality of data from a source file system, wherein selecting the level of granularization includes selecting a size for the virtual file layer;
    responsive to accessing the source file, create a target file in a target file system;
    responsive to accessing the source file and creating the target file, mount the virtual file layer over the source file and the target file;

migrate the plurality of data from the source file to the target file; and responsive to a completion of migration of the plurality of data from the source file to the target file, remove the virtual file layer from the source file and the target file, wherein the virtual file layer provides an uninterruptible migration path from the source file to the target file and reads data from and writes data to the source file and the target file during the migrating, wherein the target file system is one of: JFS, JFS2, or GPFS.

14. The computer program product of claim 13, wherein when the computer accesses the source file, the computer performs a write access.

15. The computer program product of claim 13, wherein the computer readable storage medium, so configured by the program, further causes the computer to:

perform a write access to the source file system and to the target file system.

16. The computer program product of claim 13, wherein the source file comprises one of: a file or group of files.

17. The computer program product of claim 13, wherein the source file comprises one of: a directory or a group of directories.

* * * * *